United States Patent Office 3,471,827
Patented Oct. 7, 1969

3,471,827
HYDROSTATIC-PRESSURE COMPENSATING HYDROPHONE STRUCTURE
Stephen Victor Chelminski, West Redding, and Paul Chelminski, Norwalk, Conn., assignors to Bolt Associates, Inc., Norwalk, Conn., a corporation of Connecticut
Filed May 1, 1968, Ser. No. 725,622
Int. Cl. H04b 13/02
U.S. Cl. 340—7        14 Claims

ABSTRACT OF THE DISCLOSURE

This invention provides a hydrostatic-pressure compensating hydrophone structure adapted to be towed from a craft to receive acoustic signals in a body of water such as an ocean, sea, lake, sound, etc., during the making of a seismic survey. The hydrophone structure includes a flexible tubular casing having a series of transducer assemblies positioned therein which include transducer units having a pressure compensating fluid-chamber or bladder interposed between each pair of the transducer units. The tubular body is arranged to have a liquid present between the transducer assemblies and throughout the structure. In counteraction to the hydrostatic pressure applied to the outside of the transducer units there is a compensating fluid pressure created by the corresponding depression of the fluid-chamber or bladder which is conducted through a passage in the transducer unit so as to counteract the pressure on the exterior of the units. The transducer assemblies are interconnected by conducting wires and by a stress member which have sufficient slack to remain slack during the normal towing of the structure. In the preferred embodiment, the hydrophone assemblies have peripheral water passages large enough to permit liquid to flow therethrough easily for maintaining a uniform pressure throughout the tubular body and to enable quick filling of the entire tubular body.

Background of the invention

Generally, when carrying out a seismic exploration, a survey craft proceeds along a known course with respect to a body of water such as an ocean, sea, lake, river, or sound, towing the hydrophone apparatus or structure beneath the surface of the water as seen in FIGURE 1, and means are used to generate powerful sound impulses of desired characteristics in the water. The hydrophone equipment is responsive to the acoustical signals in the water which have been reflected or refracted from the geological formations and strata beneath the body of water. The means for generating the sound impulses in the water may be associated with the survey craft or may be associated with a companion craft, depending upon the type of survey procedure being used.

In order to provide a survey which yields valuable information not only about the strata near the ocean floor but also about formations which are buried many thousands of feet beneath the ocean floor, it is important that the hydrophone equipment be extremely sensitive and accurate so as to be able to respond to the faint sound signals coming up through the water toward the surface, and that the equipment cancel out spurious signals such as wave noises, or those noises created within or by the structure when moving through the water. The hydrophone equipment is connected through an electric cable extending to the survey craft which has on board amplifier and recording apparatus which may include a chart recorder, magnetic tape recorder and electronic analytical equipment.

In the past, the hydrophone equipment which has been used in a seismic exploration system has been large and cumbersome and it was not easily carried on board because of its weight and bulk caused by protecting shoes surrounding each hydrophone unit. The hydrophone equipment, in spite of its thick protective shoes, has been delicate and any unusual bending movement or handling of the equipment would ofter result in faulty operation and lack of accuracy. The bulkiness caused disturbances, eddies and swirling which produce spurious sounds in the water in the vicinity of the equipment thus tending to mask the desired signals to be received.

Description

The present hydrophone structure overcomes these and other disadvantages of the prior art equipment in that it is a rugged, light, flexible, hydrostatic-pressure compensated structure enclosed within a small diameter casing that tows easily with minimal water disturbance and that can be readily rolled for storage. Among the advantages of the present hydrophone structure are those resulting from the fact that means within it counteract or compensate for the hydrostatic pressure or pressures that may occur or be imposed on the sound sensing areas of the series of sound detecting transducer units secured within the casing. With this arrangement, great sensitivity and accuracy are obtained, because the adverse effects of hydrostatic pressure are overcome. A further advantage is provided in that any spurious noises created within or by the structure are cancelled out or eliminated, thus the present hydrophone structure is highly reliable and sensitive to receive acoustic sounds in the water under the wide range of conditions typically encountered at sea or in a body of water during seismic explorations.

Another advantageous feature of the present hydrophone structure is that it has an internal stress member which absorbs the stress or strain on the structure when it is stretched beyond the normal amount while being towed through the water, and, thereby prevents any adverse effects on the individual sound detecting units and protects the electrical connections between them. Moreover, by virtue of the casing being suitably filled with water due to the large peripheral water passages, the acoustical signals are accurately propagated with a minimum loss or distortion from the ocean water through the wall of the casing into the interior, and the ends of the individual sound detecting units are responsive to the signals within the interior of the liquid. In addition, this hydrophone structure provides a uniform response from any direction around the axis of the casing.

This invention relates to a hydrophone structure adapted to be towed from a craft to receive acoustical signals in carrying out underwater seismic exploration. More particularly, the invention relates to a hydrostatic-pressure compensating hydrophone structure which comprises a flexible outer casing having towing means attached thereto for being towed through the water. Secured within the casing at positions spaced along the length of the casing are series of transducer assemblies. Each of the transducer assemblies include at least a pair of transducer units with one placed at each end of each assembly with a pressure-compensating fluid-chamber or bladder interposed between them.

The transducer assemblies are cylindrical and are oriented with their axes extending longitudinally within the flexible casing. The individual transducer units have a passage to permit the passage therethrough of pressure-compensating fluid, for example such as air. This fluid can flow to or from the fluid-chamber or bladder to counteract the hydrostatic pressure imposed on the sound sensing areas of the transducer units. The flexible casing and the transducer units are arranged to form liquid passageways to have interior liquid within the casing in regions between the assemblies and to allow the passage of acoustic signals from the surrounding water into the interior liquid. The transducer units are responsive to acoustical signals within the interior liquid impinging on their ends. There is provided a stress member extending longitudinally throughout the length of the flexible tubing connecting the transducer assemblies. The stress member has sufficient slack so that it remains slack when the structure is being normally towed through the water. Electrical conductors are provided to interconnect the transducer assemblies.

The various features, aspects and advantages of the hydrophone structure of the present invention will be more fully understood from a consideration of the following description of the preferred embodiment now contemplated by the inventors for carrying out the invention when considered in conjunction with the accompanying drawings.

In the drawings:

FIGURE 1 is a side partial sectional view of a hydrophone structure embodying the present invention;

FIGURE 2 is an enlarged sectional view of a portion of the hydrophone structure shown in FIGURE 1;

FIGURE 3 is a further enlarged sectional view of a transducer assembly secured within the flexible tubular casing of the hydrophone structure. The transducer units are shown with the hydrostatic pressure compensating fluid-chamber or bladder interposed between them; and FIGURE 4 is a cross-sectional view of the transducer assembly taken along line 4—4 in FIGURE 3, showing the peripheral passages for liquid within the casing and the pressure-compensating fluid orifice of the transducer unit.

As shown in FIGURE 1, the hydrophone structure 10 is adapted to be towed from a survey craft by means of a towing cable 12 extended from a towing assembly 14 and connected to a nose member 16 of the structure 10. The structure 10, has a flexible tubular casing 18 of a durable plastic material for example such as polyvinyl chloride highly plasticized which is closed on the front end by the nose member 16 to which it is secured by clamps 20. Within the casing 18 there is mounted a series of transducer assemblies 22 at points spaced along the length of the casing 18. For example, the structure 10 typically contains ten transducer assemblies 22 but in some cases it is constructed longer to contain more assemblies, and it can also be constructed shorter to contain less, e.g., four or six. Generally, a longer structure 10 containing more assemblies 22, which are relatively widely spaced, is used for making sub-bottom surveys in deeper water such as out in the ocean and a shorter structure in which the assemblies 22 are more closely spaced is used for making shallow-water surveys such as in harbors or bays. It will be understood that these relationships of length are generally the rule, but there may be different conditions which can be encountered in various geographic locations which call for exceptions to this general rule.

Accordingly, it is an advantageous feature of this invention that it provides a hydrophone structure which is convenient to make in different lengths as may be desired when the structure is assembled. This feature is pointed out because when the assemblies 22 are placed in the flexible tubing 18, they remain secured and fixed in position.

As can be best seen in FIGURE 2, the outside diameter of the transducer assemblies 22 is larger than the inside diameter of the flexible tubular casing 18. Thus, when the assemblies have been pulled into position within the casing 18, they are secured and spaced in position along the length of the hydrophone structure 10.

The respective transducer assemblies 22 are interconnected by conducting wires W and X extending slack through the structure within the casing 18. The wires W and X are connected near the nose member 20 to electric conductors extending through the towing assembly 14 to electric conductors within the towing cable 12 which is connected to suitable equipment on board the survey craft, such as recording, computing, or chart equipment. In this hydrophone structure as shown, the respective transducer assemblies 22 are connected in parallel electrical relationship to the two conductors W and X.

It will be understood that in certain cases it may be desired to connect each transducer assembly 22 individually to a pair of conductors, such as W and X, so that each transducer assembly 22 is connected by a separate direct electrical circuit to the shipboard equipment. In such an arrangement, a plurality of pairs of conductors such as W and X are included within the flexible casings 18 for providing the respective separate circuits.

There is an individual transducer unit 30 at each end of the respective transducer assemblies 22, and the coils of these transducer units 30 are interconnected in electrical parallel relationship by a pair of short electrical conductors Y and Z which in turn are connected to the respective conductors W and X. The conductors W, X, Y, and Z each comprise a multi-strand flexible wire surrounded by a waterproof plastic insulating sheath.

As shown in FIGURES 1 and 2, the transducer assemblies 22 are mechanically interconnected by a stress member 24 extending longitudinally within the casing 18, which has sufficient slack to remain slack while the structure is being normally towed through the water. This stress member 24 is described in greater detail further below and is intended to insure that the towing stress is not borne by wires W and X nor by the transducing assemblies 22, but instead by the casing 18 supplemented by the stress member 24. Accordingly, the conducting wires W and X should have more slack than the stress member 24 to prevent the imposition of any stress when the structure 10 is stretched while being towed through the water. With this arrangement, each transducer assembly 22 is isolated mechanically, being joined essentially only by the outer casing 18. Thus, a quieter and less sound producing hydrophone structure is provided.

The hydrophone structure 10 is arranged for a liquid L to be present between the transducer assemblies 22 for equalizing the interior pressure throughout the tubular casing 18. Importantly, the sound transmission characteristics of the interior liquid provides good coupling between the hydrophone assemblies and the surrounding body of water 26. In most cases this interior liquid L is water, either fresh or salt, but it is also possible to use other liquid of lower specific gravity, such as light silicone oil, depending upon the desired buoyancy of the overall structure 10. One of the advantages of this structure is that it enables the interior liquid L to be changed if desired.

When the survey conditions require that the structure 10 remain close to the surface of the body of water 26, then the liquid which is used is such as to provide an overall neutral or slightly positive buoyancy for the structure 10 as a whole. When the survey conditions require that the structure 10 be towed at a greater depth, then a liquid is used such as to provide an overall slightly negative buoyancy. In some cases fresh water L is used when the structure 10 is to be immersed in salt water to take advantage of the slightly lower specific gravity of the fresh water.

The back of the flexible tubular casing 18 is closed by a removable tail plug 28, and a rearwardly extending length of rope 29 may be attached to the tail plug 28 analogous to the tail of a kite providing frictional damping to achieve greater control in towing the hydrophone structure 10 through the water 26.

As shown in FIGURES 2 and 3, the respective transducer assemblies 22 include a pair of spacer transducer units 30 having a tubular pressure compensating fluid-chamber or bladder 32 interposed between them. The bladder 32 may be a flexible plastic material such as an extruded polyurethane, i.e., a pressure-responsive-depressible or deflectible material, which is bound by a suitable adhesive 33 to the outer surfaces of the two units 30.

The region 35 within the pressure-compensating chamber 32 is filled with a fluid which can flow readily in response to pressure and which is compressible, such as a gaseous fluid, so that the diaphragm D can vibrate in response to seismic sound, as will be explained further below. In this preferred embodiment the region 35 is filled with a gaseous fluid, preferably air. Other gaseous fluids such as nitrogen, helium, carbon dioxide, etc. may be used; however air is preferred because of its availability.

The individual transducer assemblies 22 are firmly secured in position within the casing 18 due to the fact that the outside diameter of the assemblies 22 is larger than the inside diameter of the flexible tubing 18. The units 30 at each end of the assembly 22 are identical, and each include a cylindrical permanent magnet 37 having coils of a winding 39 surrounding it which are insulated from the magnet and are embedded in a resinous compound. This coil 39 contains several thousand turns of a fine enamel coated magnet wire which is surrounded by a cylindrical element 34 of a magnetically permeable material, such as soft iron, to provide a return path for the flux. A disc 31 covers the inner end of the magnet 37 and extends out to the cylindrical element 34 so as to complete the return path for magnetic flux.

As can be seen, in FIGURES 1 and 2, the hydrophone transducer units 30 are individually responsive to acoustical signals carried by the internal liquid L and impinging upon a movable diaphragm D located at the outer end of each of the units 30. These transducer units 30 operate upon the variable reluctance principle, that is, the acoustical signals being received cause movement of the diaphragm D which carries a magnetically permeable armature that varies the amount of magnetic flux linking with the winding 39, thereby to produce electrical signals corresponding with the acoustical signals.

The diaphragms D are formed by a flexible plastic shell 36 of generally cup-shaped configuration including a membrane 38 having a magnetically permeable disc armature 40 secured thereto, preferably by an inwardly protruding rubber nib 41 which projects through a concentric hole in the disc 40. To couple the armature disc 40 tightly to the membrane 38, the nib 41 is pre-stretched inwardly and a non-magnetic pin is passed through the nib so that the disc accurately follows the slightest movement of the rubber shell membrane 38. Within the unit 30, positioned between the end of the permanent magnet 37 and the armature 40 are four coil springs 42 which are retained in position by a non-magnetic plate 44 which is rigid, such as being made of fiberglass and epoxy resin. This spring retainer plate 44 is cemented to the end of the magnet 37 and includes four symmetrically positioned holes which serve as sockets for receiving the inner ends of the respective coil springs 42.

The cylindrical element 34 also serves as a mechanically rigid protective frame for the interior of the unit 30. A rigid cylindrical skirt 46 of non-magnetic metal extends from the end of the frame element 82 out near to the periphery of the armature disc 40 to support the periphery of the membrane 38.

The cup-shaped flexible shell 36 is formed of suitable flexible material such as rubber or polyurethane. In this preferred example the shell 36 is of polyurethane, and the membrane 38 is formed by a thin end wall of the shell 36. In order to provide liquid flow passages within the casing 18, the cylindrical wall of the shell 36 is formed with a plurality of axially extending grooves or channels 52 of generally semi-circular cross sectional shape.

As shown in FIGURE 4, there are five of these channels which are spaced apart by 60° increments about the periphery of the shell 36. Thus, two of the channels, at the left in FIGURE 4, are spaced apart by 120°, and this is the location in which the connections Y and Z to the coil 39 are made. As seen in FIGURE 4, there is a radial opening 50 in the frame element 34 and the ends of the winding 39 are brought out through this opening to be soldered to the insulated wires Y and Z.

The cup-shaped shell 36 includes an inner annular shoulder 51 which is located at the periphery of the membrane 38 at the juncture with the cylindrical wall 36. This shoulder 51 has a diameter just large enough to fit snugly over the rim of the cylindrical skirt 46. Thus, the shoulder 51 fits over the skirt 46, as seen in FIGURE 3, for centering the shell 36 about the frame element 34.

When building the assemblies 22, the electrical connections are soldered to the coils 39. The ends of the compensating bladder 32 are fitted over the respective frame elements 34. The stress member 24 includes a pair of flexible stranded stainless steel cable 25 (FIGURE 3) which extend through small holes 53 in the shoulder region 51 of the shell 36. The armature disc 40 is attached by the nib 41, and the springs 42 are put in their sockets in the retainer plate 44. Then the shell 36 is fitted over the frame element 34 with the annular shoulder 51 seated on the skirt 46 so that a space extends around the frame element 34 within the cylindrical wall of the shell 36.

A castable plastic material 33, which will bond with the wall of the shell 36, with the metal 34, and with the end of the bladder 32 is poured into this space and is caused to set therein so as to form an integral waterproof assembly 22. This sealing material 33 also bonds to the stress cables 25 to secure the pair of cables 25 to the frame element 34.

Referring to FIGURE 3, there is provided an axial passage 54 extending through the magnet 37 with a restricted orifice 56 in the disc 31. This restricted passage 54, 56 permits fluid, such as air, to flow from the region 35 within the pressure compensating air-chamber or bladder 32 into the space behind the diaphragm D. With this arrangement, when there is any pressure, i.e., hydrostatic pressure, imposed on the diaphragm D this same pressure is imposed on the exterior of the bladder 32, causing it to be depressed and this causes air to pass first through the orifice 56 and then through the passage 54 so that the increased air pressure is applied against the armature 40 which is in direct contact with the diaphragm D. Thus, for any hydrostatic pressure applied on the exterior of the diaphragm D there is an equal and compensating pressure created on the interior of the diaphragm D by the depression of the bladder 32 so as to oppose the pressure applied to the outside of the diaphragm D. Accordingly, any spurious effects or distortion which would otherwise be caused by the crushing effect of hydrostatic pressure on the diaphragm D tending to collapse the springs 42, which are due to unnecessary movement of the diaphragm D are eliminated. The restricted orifice 56 is provided to lessen or mitigate any surge of the air directed through the air passage 54 to counteract the hydrostatic pressure on the outside of the diaphragm D. In other words, the orifice 56 limits the response of the bladder-diaphragm system to a very low frequency which is below the acoustical seismic frequencies being received, i.e., the response of the bladder-diaphragm system is restricted to very low, sub-seismic frequencies, and thereby the undesired hydrostatic effects are eliminated so as to provide a more sensitive and accurate instrument.

Referring to FIGURE 4, the channels 52 are preferably of such a size as to form with the outer casing large liquid-flow passages so that casing 18 can be easily and quickly filled with the liquid flowing from the back end in and through the hydrophone structure. To do this, the tail plug 28 is removed. These large water passages 52 avoid disturbance or pressure surges in the structure due to the liquid passing therethrough. Also, it is noted that with large water passages 52, the hydraulic propagation of the individual assemblies 22 is avoided, that is, there is avoided, piston-in-cylinder effect of the liquid L upon the individual assemblies 22 within the outer casing 18, because the liquid L can flow freely past them.

As described above, the stress member 24, includes a pair of flexible stainless steel cables 25 (FIGURE 3) embedded in and anchored by the solidified plastic 33, as shown in FIGURE 2, these cables 25 are terminated in loops 60 secured by crimped ferrules or cable clamps 62. Extending between the respective loops 60 is an electrically non-conducting portion of the stress member 24. This non-conducting portion 64 is formed by a strong rope or line of suitable hemp, cotton or plastic material of high tensile strength, for example such as nylon, Dacron, or polypropylene line, which is tied at 66 to the respective loops 60.

In normal operation we have found that the hydrophone structure 10 is more sensitive and accurate in response when using a slack stress member 24 in which the portions 64 extending between the assemblies 22 are non-conducting. Our theory for explaining this is that a taut stress member 24 vibrates and thus causes noise generation which interferes with or masks the faint acoustical seismic vibrations intended to be received. Also, our theory is that a non-conducting line 64 is not subject to electrical induction or pick-up and has less tendency to vibrate than would a metallic cable, i.e., the rope or line has greater self-damping qualities. Regardless of whether our theories are correct, we have found from trials under operating conditions that the structure as disclosed herein is very sensitive and accurate. The individual assemblies 22 are effectively mechanically, vibrationally isolated one from the other by the slack lines 64 and slack conductors W and X.

In order to provide the slack stress member 24, slipknot loops are made in the line portions 64 which are prevented from slipping out by winding these loops around a solid dissolvable substance which can later be dissolved in the Liquid L.

In practice we have found that sugar cubes work to advantage for this purpose.

After the loops have been formed in the lines 64 and have been wound on sugar cubes, then the stress member 24 is used to pull the string of assemblies 22 into position within the tubular casing 18. During this pulling the stress member 24 is taut.

After the assemblies 22 are in position, then the dissolvable substance is removed by flushing out the casing 18 with a suitable liquid, for example such as water to remove the sugar. Thus, the stress member 24 now becomes slack. The relative amount of slack in the conductors W and X is greater than that in the stress member 24.

In the event the hydrophone structure 10 is subjected to excessive longitudinal stress, causing the casing 18 to stretch, then the stress member 24 takes up the stress load as the casing 18 stretches. In this way the conducters W and X and their connections are protected from stress being applied to them.

This hydrophone structure is effective and highly sensitive to any acoustic signals impinging thereon with the liquid L filling the interior between the assemblies 22 and throughout the structure as shown in FIG. 1. It is to be noted that each transducer assembly with its pair of transducer units 30 provides a balanced electrical output with respect to the axial acceleration, because any forces resulting from axial acceleration tend to cause the armature discs 40 to move in the same direction during such acceleration, i.e., one toward and the other away from their respective permanent magnets.

Thus, the reduction in reluctance at one end of each assembly 22 cancels out the increase in reluctance at the other end, and vice versa so that each assembly 22 individually, and hence the structure as a whole, is non-responsive to axial acceleration.

It will be understood that the restricted fluid passage 54, 56 is for the purpose of providing communication between the chamber 35 and the region 70 which is located behind the diaphragm D. This restricted passage may be located at any desired position within the transducer unit 30. Its location is not critical. For example, this restricted passage can be drilled in an axial direction through the wall of the cylindrical element 34; however, the concentric location of the restricted passage, as shown, is preferred for reasons of symmetry.

It is noted by potting the hydrophone assembly inside the molded cup shell 36 there is provided a highly integral structure, i.e., it is unlikely that leaks into or out of the assembly 22 will occur and also the electrical circuit can be completely insulated without being taped or spliced. This also means that a non-insulating liquid, such as salt water, can be used within the flexible tube 18. The stainless steel cable portions 25 of the stress number 24 are also firmly potted into and anchored to the individual transducer assemblies, as explained in detail above.

The flexible tubing casing 18 is shown as formed of a highly plasticized polyvinyl chloride having a relatively thin wall which can withstand many towing stresses and forces in the water without failing and can adequately protect the internal structure of the hydrophone when the structure 10 is reeled up.

The overall diameter of the hydrophone structure is only about 2¾ inches, and tests have shown that this relatively small diameter structure having a rounded nose 16 is capable of being towed through the water with very little turbulence so that it has the ability to pick up very faint acoustical signals in the body of water 26.

From the foregoing it will be understood that the pressure-compensating hydrophone structure described above is well suited to provide the advantages in operation as set forth, and that variations may be made in the features of this invention and that the structure herein described may be varied in various parts, all without departing from the scope of the invention. It is to be understood that all matter herein set forth and shown in the accompanying drawings is to be interpreted as illustrative and not in a limiting sense and that in certain instances, some of the features of the invention may be used without a corresponding use of other features, all without departing from the scope of the invention as defined by the appended claims.

What is claimed is:

1. A hydrostatic-pressure compensating hydrophone structure adapted to be towed from a craft to receive acoustic signals in a body of water during the making of a seismic survey of geological formations beneath the body of water, said hydrophone structure comprising: a flexible tubular casing having towing means attached thereto for being towed through the water; a plurality of hydrophone transducer assemblies positioned within the tubular casing at positions spaced along the length of the tubular casing; said tubular casing being adapted to have liquid therein in the spaces between said transducer assemblies and being adapted to allow passage of acoustical signals from the surrounding body of water into the interior liquid; said hydrophone structure having passages extending between said spaces to enable the liquid to flow therethrough between said spaces; each transducer assembly including at least a pair of spaced transducer units; flexible bladder means defining a pressure-compensating fluid chamber associated with the transducer units; each of said transducer units including a diaphragm movable in response to acoustic signals impinging theron; and each of said transducer units having a fluid-flow passage communicating between the interior of the pressure-compensating chamber and the region behind the diaphragm for permitting fluid to flow between the compensating chamber and the region behind the diaphragm in response to changes in hydrostatic pressure.

2. A hydrostatic-pressure compensating hydrophone structure as claimed in claim 1 in which said passages for the pressure-compensating fluid are restricted to limit the response of the bladder-diaphragm system to a very low frequency, below the lowest acoustical signal frequency intended to be received, thereby to compensate for hydrostatic effects while maintaining sensitivity to the acoustical signals desired to be received.

3. A hydrostatic-pressure compensating hydrophone structure as claimed in claim 1 in which the liquid within the casing in the spaces between the hydrophone assemblies can flow from space to space within the casing through passages defined by channels in the transducer assemblies; said channels extending longitudinally of the periphery of the transducer assemblies adjacent to the inside surface of the tubular casing for defining liquid-flow passages adjacent to the inside surface of the casing.

4. A hydrostatic-pressure compensating hydrophone structure as claimed in claim 3 in which the liquid-flow channels in the transducer assemblies extend longitudinally along the peripheries of the spaced transducer units in each transducer assembly; the flexible bladder means being of smaller outside dimension than the periphery of the transducer units whereby liquid flowing through the channels can surround the bladder means.

5. A hydrostatic-pressure compensating hydrophone structure as claimed in claim 1 in which each transducer assembly includes a pair of spaced transducer units; said pair of transducer units being located at opposite ends of the transducer assembly with the flexible bladder means being positioned therebetween defining a pressure-compensating chamber between the transducer units; the movable diaphragms of the respective transducer units being located at opposite ends of the assembly and facing in opposite directions; the fluid-flow passages extending from the compensating chamber through the respective transducer units to the regions behind the diaphragms at opposite ends of the assembly; and the pair of transducer units in each assembly being electrically interconnected for cancelling effects of axial acceleration of the hydrophone structure.

6. A hydrostatic-pressure compensating hydrophone structure as claimed in claim 1 in which a stress member extends longitudinally throughout the length of the tubular casing; said stress member interconnecting the respective transducer assemblies and being slack within said casing during normal towing of the hydrophone structure through the water; electrical conductors extending longitudinally within said casing; and said conductors being arranged to have more slack therein between said assemblies than said stress member, whereby the stress member protects the conductors from imposition of stress thereon if the casing becomes abnormally stretched and whereby the normally slack stress member enables the hydrophone structure to be quiet and sensitive in operation.

7. A hydrostatic-pressure compensating hydrophone structure as claimed in claim 6 in which the stress member includes a non-metallic line extending between the hydrophone assemblies; said non-metallic line being located within said tubular casing and being immersed in the liquid therein, thereby providing self-damping action for mechanically vibrationally isolating the transducer assemblies one from another.

8. A hydrophone structure adapted to be towed from a craft to receive acoustical signals in a body of water during the making of a seismic survey of geological formations beneath the body of water, said hydrophone structure comprising: a flexible tubular casing adapted to be towed through the water; a plurality of hydrophone transducer units positioned within the tubular casing at positions spaced along the length of the tubular casing; said tubular casing being adapted to be filled with liquid and being adapted for the transmission of acoustical signals from the surrounding water through the flexible tubular casing into the interior liquid; said transducer units being generally cylindrical about an axis and each being oriented with its axis extending axially within the casing; said transducer units fitting snugly within said tubular casing and providing liquid-flow passages for the liquid to pass through when filling the casing; a stress member extending along within the casing and being attached to said transducer units; said stress member having slack therein within said casing; electrical conductors extending along within said casing and having more slack than said stress member; each of said transducer units having a movable diaphragm communicating with the liquid within said casing to be responsive to the acoustical signals being received; pressure-compensating bladder means associated with each of said transducer units; said bladder means providing a pressure-compensating fluid chamber and being deflectible and communicating with the liquid within said casing to be responsive to the hydrostatic pressure thereof; and each of said transducer units having a fluid-flow passage providing communication between the region behind the diaphragm and said pressure-compensating fluid chamber.

9. A hydrophone structure for making seismic surveys as claimed in claim 8 in which said transducer units are arranged in pairs with a pressure-compensating bladder positioned between and interconnecting the hydrophone units of the respective pairs to form an assembly; said bladder defining a chamber interposed between the pair of transducer units; and said chamber communicating through the respective fluid-flow passages with the regions behind both diaphragms of the respective transducer units.

10. A hydrophone structure for making seismic surveys as claimed in claim 9 in which said pressure-compensating bladders are tubular and have a smaller outside diameter than the inside diameter of said casing; said tubular bladders extending axially between the respective transducer units of each pair defining an annular space surrounding the bladder within the casing; the liquid flow passages provided by the transducer units being defined by a plurality of longitudinally extending channels in the peripheries of said transducer units; and said peripheral channels communicating with the annular space surrounding said tubular bladder for filling said annular space with liquid within said casing.

11. A hydrophone assembly adapted to be used for the making of seismic surveys comprising: a pair of transducer units each having a generally cylindrical configuration; said units being spaced apart in axial alignment; a flexible tubular bladder extending axially between said units and being secured to each of said units in fluid-tight relationship defining a pressure-compensating chamber therein; said transducer units each having a movable diaphragm on the respective outer end thereof movable in response to acoustical signals impinging thereon; said units each having a region behind the diaphragm; spring means urging the respective diaphragms outwardly; each of said units having a fluid-flow passage communicating between the pressure-compensating chamber and the respective regions behind said diaphragms.

12. A hydrophone assembly adapted to be used for the making of seismic surveys as claimed in claim 11 in which each of said hydrophone units is surrounded on its outer end and on its periphery by a flexible cup-shaped shell; said shells having a larger diameter than the tubular bladder and said shells overlapping the respective ends of the tubular bladder; hardenable bonding material filling the space between said shells and the ends of the tubular bladder forming a fluid-tight seal therebetween; and the ends of the respective shells comprising flexible membranes for said diaphragms.

13. A hydrophone assembly adapted to be used for making seismic surveys as claimed in claim 12 including a plurality of flexible stress member cables extending in an axial direction along near the exterior of the tubular bladder; said cables extending through said hardenable bonding material within the shell of each transducer and being thereby anchored to the respective transducer, the ends of said cables being symmetrically connected together at a location spaced beyond the diaphragms and positioned on the axis of the assembly.

14. A hydrophone assembly adapted to be used for making seismic surveys as claimed in claim 12 in which said diaphragms at the outer ends of said transducer units include a magnetically permeable armature attached to the interior of said membranes; the spring means including a plurality of small coil springs extending in an axial direction with the outer ends of the springs thrusting against the armature; and retainer means engaging the inner ends of said coil springs for holding them in position.

References Cited

UNITED STATES PATENTS 3,018,467   1/1962   Harris _____ 340—8
3,319,734   5/1967   Pavey _____ 181—.5

RODNEY D. BENNETT, Jr., Primary Examiner

B. L. RIBANDO, Assistant Examiner

U.S. Cl. X.R.

340—8